(12) United States Patent
Fujii

(10) Patent No.: US 7,118,147 B2
(45) Date of Patent: Oct. 10, 2006

(54) HANDLING ROBOT SYSTEM HAVING ROBOT HAND

(75) Inventor: Takashi Fujii, Minamitsuru-gun (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/965,204

(22) Filed: Oct. 15, 2004

(65) Prior Publication Data

US 2005/0082856 A1     Apr. 21, 2005

(30) Foreign Application Priority Data

Oct. 17, 2003     (JP) .............................. 2003-357932

(51) Int. Cl.
B25J 15/04     (2006.01)
B25J 9/10     (2006.01)

(52) U.S. Cl. ............... 294/103.1; 294/86.4; 294/119.1; 901/39

(58) Field of Classification Search .................. 294/2, 294/86.4, 119.1, 902; 901/31, 32, 38, 39; 90/41; 483/901; 269/279–281, 283, 284
See application file for complete search history.

(56) References Cited

U.S. PATENT DOCUMENTS

| | | | | |
|---|---|---|---|---|
| 2,390,293 A | * | 12/1945 | Colson ..................... | 294/86.41 |
| 4,047,709 A | * | 9/1977 | Thyberg et al. ............... | 269/22 |
| 4,561,506 A | * | 12/1985 | Booker ......................... | 173/39 |
| 4,572,564 A | * | 2/1986 | Cipolla ......................... | 294/88 |
| 4,636,135 A | * | 1/1987 | Bancon ....................... | 414/730 |
| 4,652,203 A | * | 3/1987 | Nakashima et al. ........ | 414/730 |
| 5,005,889 A | * | 4/1991 | Nerger et al. ............... | 294/86.4 |
| 5,083,352 A | * | 1/1992 | Nakako ......................... | 29/57 |
| 5,161,847 A | * | 11/1992 | Yakou ..................... | 294/119.1 |
| 5,360,249 A | * | 11/1994 | Monforte et al. ........ | 294/119.1 |
| 5,403,057 A | * | 4/1995 | Sugito et al. ............ | 294/119.1 |

FOREIGN PATENT DOCUMENTS

| | | |
|---|---|---|
| JP | 60-62488 | 4/1985 |
| JP | 5-192888 | 8/1993 |
| JP | 7-238869 | 12/1995 |
| JP | 2000-167791 | 6/2000 |

* cited by examiner

*Primary Examiner*—Dean J. Kramer
(74) *Attorney, Agent, or Firm*—Drinker Biddle & Reath LLP

(57) ABSTRACT

In a robot hand according to the present invention, a first-type grasping claw driven by a servo motor on a hand base and a second-type grasping claw having no actuator are used with the grasping claws mounted on each holding unit. The second-type grasping claw is movable in a direction perpendicular to a moving direction of the first-type grasping claw. The robot is operated so that an external force is applied to the grasping claw by bringing the grasping claw into contact with a contact surface of a stationary stand member, thereby to change a position of the grasping claw relative to the hand base and that grasping claw is locked at that position by a brake mechanism. Each grasping claw is adapted to be able to be mounted or dismounted on or from the holding unit using a pull bolt and a retaining mechanism, and can be automatically changed by the robot operation. By attaching the pull bolt to the workpiece in advance, the retaining mechanism also can be used for holding the workpiece.

3 Claims, 8 Drawing Sheets

HANDLING ROBOT SYSTEM HAVING ROBOT HAND

BACKGROUND OF THE INVENTION

1. Field of the Invention

The present invention relates to a robot hand structure, of an industrial robot, for handling a workpiece and to a handling robot system having the same.

2. Description of the Related Art

An industrial robot for performing a handling operation is intended to handle not one type of workpiece, but, in most cases, different types of workpieces of different shapes and sizes. For this reason, operation requirements often cannot be met by a robot system having only one type of robot hand (hereinafter referred to simply as a "hand") prepared for grasping a workpiece. Also, in the case that a single type of workpiece is handled, a portion of the workpiece to be grasped may be required to be changed depending on a specific requirement of a handling operation. In this case, if the shape of the held portion of the workpiece is different before and after the change, a single type of hand, similarly, cannot meet the requirements suitably. Further, in the case that a grasping claw is required to have a shape conforming to the shape of the workpiece, it is difficult to perform the handling operation with a single hand.

In order to address such a situation, it has conventionally been the common practice to prepare a plurality of types of hands in accordance with the number of workpiece types or the number of operation types. Each of the prepared hands often has built therein the required number of grasping claws (grasping members), an actuator for causing the grasping claws to perform the grasping operation (such as motor, air cylinder, etc.), and a drive mechanism for driving the grasping claws with the actuator. To change the hand, on the other hand, a hand retaining unit for changing a hand is widely used. In the case that a plurality of types (three types in this case) of workpieces 6, 7, 8 having different shapes are handled, for example, using a handling robot (robot mechanical part) 1 having six degrees of freedom (axes) as shown in FIG. 1, different hands 3, 4, 5 suitable for grasping the different workpieces are used to execute different types of handling operations.

The hand retaining unit 2 is arranged at a forward end of an arm of the handling robot (hereinafter sometimes referred to simply as the "robot") 1, and one of the prepared hands 3 to 5 is mounted on the robot via the hand retaining unit 2. FIG. 1 shows the workpiece 6 being grasped by the hand 3 mounted on the robot. Each of the hands 3 to 5 has built therein grasping claws having an arrangement, shape and size suitable to grasp one of the workpieces 6 to 8, and an actuator to cause the grasping claws to perform the grasping operation. Drive mechanisms for moving the robot 1 along each of axes thereof are controlled by a robot control unit (not shown) in a well-known manner, while the hand retaining unit 2 and the actuators for the hands to perform the grasping operation are also controlled by the robot control unit.

When the hand is changed (for example, the hand 3 is replaced with the hand 4), the robot 1 is moved, for example, to an access point to a fixation holder for the hand 3, and a hand release command is sent from the robot control unit to the hand retaining unit 2 to release the hand 3 and bring the hand 3 back to the fixation holder for the hand 3. Then, the robot 1 is moved, for example, to another access point to a fixation holder for the hand 4, to engage the hand retaining unit 2 with the hand 4, and a command to lock the hand 4 is sent from the robot control unit to the hand retaining unit 2. In this way, the hand 3 is completely replaced with the hand 4. The hand retaining unit 2 is also equipped with a mechanism for connecting or disconnecting a signal line system, etc., to the actuator built in each hand when the hand is replaced.

However, in the case that the hand including the grasping claws, the actuator and the drive mechanism for the grasping claws is changed to deal with a great variety of shapes, etc., of the workpieces, as in the prior art described above, a problem may be caused in which both the actuator and the drive mechanism are liable to interfere with devices surrounding the workpiece in a wide area so that the handling operation may be hampered. For example, in the case that ten types of hands are prepared for a hand changing, nine hands other than the hand in use exist in an operation range of the robot and occupy a considerable volume of space, resulting in an increased risk of interference.

An attempt to handle a plurality of types of workpieces with a few types of hands, on the other hand, would cause a problem in which the shape, etc., of the grasping claw may fail to conform to the shape of a particular workpiece, thereby resulting in an increased possibility of the workpiece being grasped erroneously or dropped. Further, in the case that a grasping claw having a shape suitable for a particular workpiece having a unique shape is required, it is necessary to prepare a hand having dedicated grasping claws having the shape suitable for each type of the workpieces, thereby increasing the system cost.

SUMMARY OF THE INVENTION

Therefore, a primary object of the present invention is to solve the above-mentioned problems of the prior arts by reducing the number of the actuators used in the handling robot system and the number of the drive mechanisms for causing the grasping claws to perform the grasping operation with the actuators, thereby facilitating a reduction of possibility of interference and cost. The invention is also intended to diversify a form of handling a workpiece by proposing a method of using the mechanism for retaining the grasping claws of the hand as a means for retaining the grasping claws and/or a means for holding the workpiece.

The present invention proposes to employ a grasping claw of which a position relative to a base portion of the hand can be adjusted without an actuator for causing the grasping claw to perform the grasping operation, in order to make it possible to deal with a great variety of workpiece shapes using a smaller number of actuators. Also, the present invention introduces an idea that the base portion of the hand having the actuator built therein and the grasping claw are separable from each other. These techniques realize a robot hand structure which makes it possible to construct an inexpensive handling robot system capable of grasping the workpieces in a proper way by preparing only grasping claws suitable to the shapes of the workpieces even if a plurality of workpieces having a multiplicity of considerably different shapes must be handled. Further, the present invention proposes a method of using the mechanism for retaining the grasping claw as a means for retaining the grasping claw and/or a means for holding and releasing the workpiece, for example, in order to make it possible to handle a workpiece not suitable for being grasped by the grasping claw.

Specifically, a robot hand mounted on a robot for handling a workpiece according to the present invention includes a base member, a first claw mechanism and a second claw mechanism. The first claw mechanism includes at least one first grasping claw, a first support means for movably supporting the first grasping claw and an actuator for moving the first grasping claw relative to the base member.

On the other hand, the second claw mechanism includes at least one second grasping claw, a braking means adapted to be in a release state or an operating state, and a second support means for allowing an external force applied to the second grasping claw to move the second grasping claw with respect to the base member and change a relative position thereof relative to the base member when the braking means is in the release state, while supporting the second grasping claw to hold the relative position when the braking means is in the operating state.

The external force is applied to the second grasping claw by operating the robot to move the base member with the second grasping claw in contact with a contact member which is arranged at a predetermined position in an operational range of the robot having the hand mounted thereon. A servo motor controlled by a robot control means for controlling an operation of the robot in a direction along each axis can be used as an actuator.

The present invention also proposes that at least one of the first grasping claw and the second grasping claw is configured to be replaceably mounted on a selected one of the first support means and the second support means. For example, an engaging portion may be disposed in a rear portion of the replaceable grasping claw, and a retaining mechanism capable of engaging and disengaging the engaging portion with or from the selected supporting means is disposed on the supporting means of each grasping claw.

The replaceable grasping claw can be equipped with a claw body and a pull bolt mounted in a threaded hole formed in a rear portion of the claw body. In the case that such a pull bolt is used, the engaging portion can be disposed in a rear portion of the pull bolt. Also, the change of the replaceable grasping claw can be automatically performed by a robot operation.

Further, the present invention proposes a handling robot system in which the mechanism for retaining the grasping claw can be used as a means for retaining the grasping claw and/or a means for holding a workpiece. This handling robot system can handle a workpiece having attached thereto a pull bolt with an engaging portion formed in a rear portion thereof, using a robot having a robot hand mounted thereon. In this system, when the replaceable grasping claw is removed, the retaining mechanism can engage with the engaging portion of the pull bolt, instead of the replaceable grasping claw, to hold a workpiece.

BRIEF DESCRIPTION OF THE DRAWINGS

The above and other objects, features and advantages of the present invention will be described in more detail below based on the preferred embodiments of the present invention with reference to the accompanying drawings, wherein.

DETAILED DESCRIPTION

Figure 1:
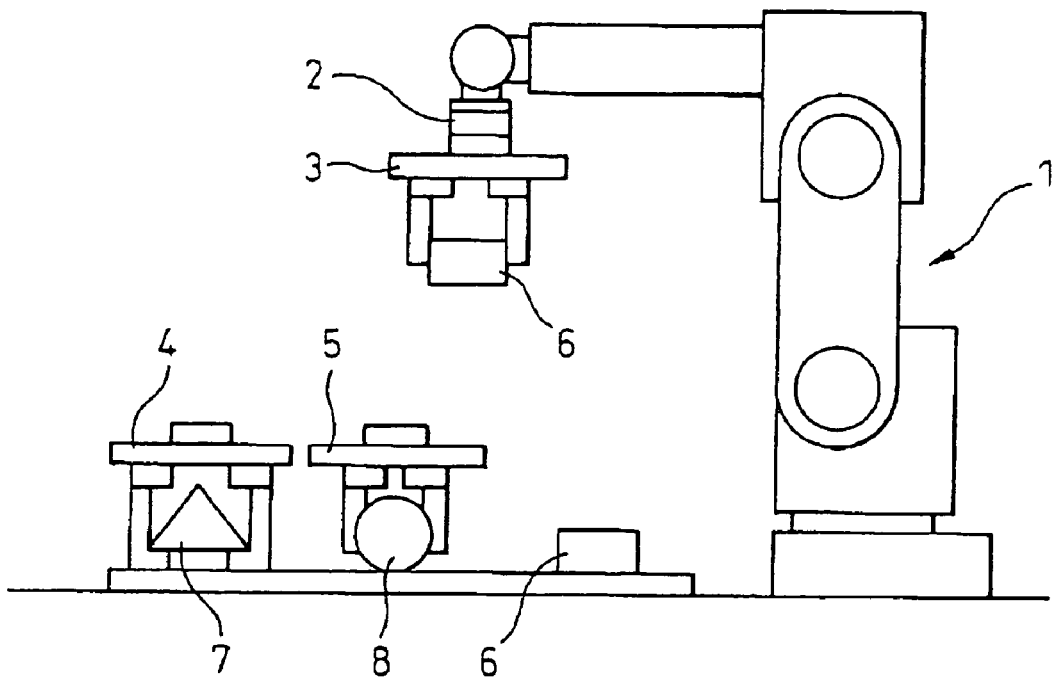
FIG. 1 is a schematic diagram showing a general configuration of a conventional handling robot system in which a hand retaining unit is used to change a hand.
Figure 2:
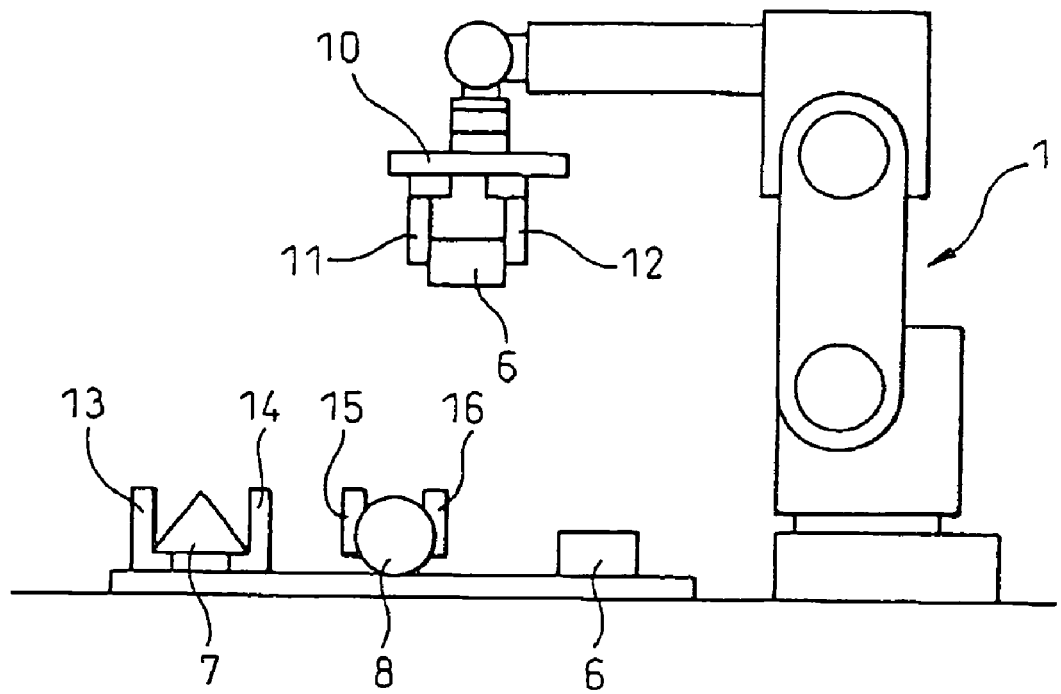
FIG. 2 is a schematic diagram showing a general configuration of a handling robot system according to an embodiment of the present invention.
Figure 3:
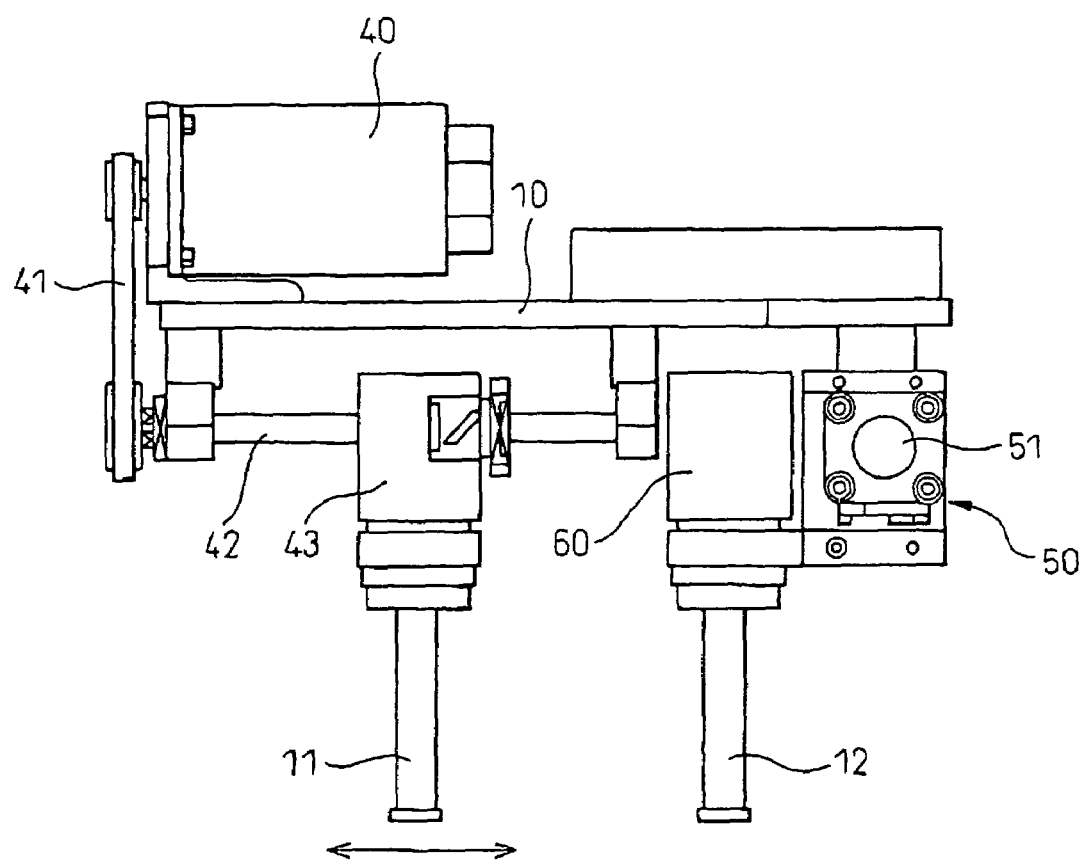
FIG. 3 is a side view of the robot hand shown in FIG. 2.

FIG. 2 is a schematic diagram showing a general configuration of a handling robot system according to an embodiment of the present invention. In FIG. 2, reference numeral 1 designates a handling robot, having six degrees of freedom (axes), and a drive mechanism for each axis is controlled by a robot control unit (not shown) in a well-known manner. Although such a configuration of a mechanical part of the robot 1 is not specifically different from the one shown in FIG. 1, a robot hand (hereinafter referred to also as the "hand mechanism") having a feature of the present invention is mounted at a forward end of an arm of the robot as described later. The hand mechanism includes a robot hand base member 10 fixedly mounted at the forward end of the arm of the robot 1, and a support means for supporting "a plurality of grasping claws" so as to be movable relative to the hand base member 10 in a manner described later. A part of the grasping claws has an actuator for performing a grasping operation, while the other grasping claws have no actuator for performing a grasping operation.

For convenience' sake, the former grasping claws are referred as the "first-type grasping claws" and the latter grasping claws as the "second-type grasping claws". In FIGS. 2 to 8, the first-type grasping claws are designated by reference numerals 11, 13, 15, and the second-type grasping claws by reference numerals 12, 14, 16, 22. The second-type grasping claw is adapted to be able to change a relative position relative to the hand base member 10 by utilizing an external contact member and a movement of the robot 1 in the manner described later to apply an external force to the second-type grasping claw. The changed relative position is held by use of a brake mechanism, and the second-type grasping claw can move again when the brake mechanism is unlocked.

Also, as described later, in this embodiment, a direction in which the second-type grasping claw is moved for adjusting a position thereof is at right angles to a direction in which the first-type grasping claw is moved for performing the grasping operation. However, in some cases, a direction in which all or part of the second-type grasping claws are moved for adjusting a position thereof nay be diagonal or parallel to the direction in which the first-type grasping claws are moved for performing the grasping operation. In this way, an arrangement of a plurality of grasping claws can be changed by adjusting the position of the second-type grasping claws, thereby improving an ability to deal with workpieces having a great variety of shapes and sizes.

Further, at least one or preferably all of the first-type and second-type grasping claws are replaceably mounted on the support unit for supporting each grasping claw in the manner described below. Referring to FIG. 2, a plurality of sets of the first-type and second-type grasping claws including (11, 12), (13, 14) and (15, 16) suitable for grasping three types of workpieces 6 to 8 are prepared, and the first set of grasping claws 11, 12 of these sets is mounted and used on the hand mechanism. It should be noted that although only one first type of grasping claw and one second-type grasping claw are shown for convenience of illustration, two second-type grasping claws are mounted and used on the hand mechanism in this embodiment at the same time.

However, regarding both of the first-type grasping claws and the second-type grasping claws, an appropriate one or more number of grasping claws generally may be mounted and used on the hand mechanism, and the number of the mounted grasping claws may be changed depending on types of workpieces to be grasped. In this way, the ability to deal with workpieces having a great variety of workpiece shapes can be improved by making the grasping claws replaceable.

Next, a structure and the functions of the hand mechanism in this embodiment will be described with additional reference to FIGS. 3 to 8. Firstly, referring to FIG. 3, a servo motor 40 constituting an actuator for causing the hand to perform the grasping operation is mounted on the hand base 10. A rotational motion of an output shaft rotated by this servo motor 10 through a reduction gear (not shown) is transmitted to a ball screw mechanism 42 through a transmission mechanism 41 using a pulley, a belt, etc. As is well known, the ball screw mechanism 42 is used for converting a rotational motion into a linear motion and is fixed on the hand base 10.

Once the servo motor 40 is activated, a support unit (first support unit) 43 engaging with the ball screw of the ball screw mechanism moves leftward or rightward in the drawing depending on a rotational direction of the servo motor 40. As a result, a relative position of the first-type grasping claw 11 supported on the support unit 43 relative to the position of the hand base 10 is changed. The servo motor 40, which is provided separately from the servo motor for driving each axis of the mechanical part of the six-axis robot 1, is an actuator for driving the seventh axis in this case. This servo motor 40, like the other servo motors, is supplied with a current and the rotational position, rotational speed and torque thereof are controlled by a robot control unit (not shown).

In this embodiment, when a command "close the hand" is issued from the robot control unit, the first support unit 43 for supporting the first-type grasping claw 11 is moved rightward in the drawing in order to grasp a workpiece (not shown in FIG. 3) positioned between the grasping claw 11 and the grasping claw 12. When a command "open the hand" is issued, the first support unit 43 is moved leftward in the drawing in order to release the grasped workpiece.

On the other hand, the grasping claw 12 is the second-type grasping claw supported on the support unit 60. Though not plotted in FIG. 3, another second-type grasping claw (see reference number 22 in FIG. 5) is supported on a support unit similar to the support unit 60. The operation of adjusting the position of the second-type grasping claw will be described now with reference to the grasping claw 12 as an example.

The support unit 60 is integrally coupled to the brake mechanism 50, and a brake member of the brake mechanism 50 is fitted on a linear guide 51 in the manner described later. Therefore, when the locking of the brake mechanism 50 is released, the grasping claw 12 can move forward and backward (in the direction perpendicular to the page) in FIG. 3 together with the support unit 60 and the brake mechanism 50. Another second-type grasping claw described above is similar to the first-type grasping claw.

Figure 4:
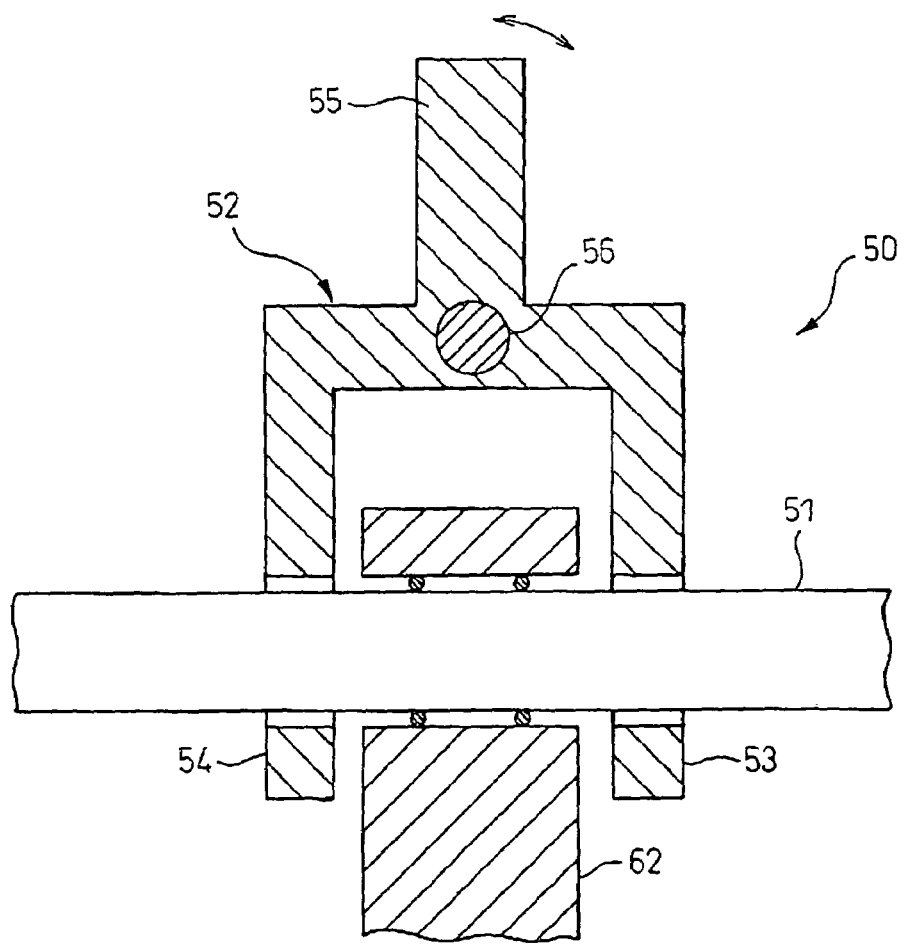
FIG. 4 is a sectional view illustrating how a second-type grasping claw shown in FIG. 3 is switched between a movable mode and a position holding (restricted) mode by turning on/off a braking operation (locking operation) of a brake mechanism.

FIG. 4 is a sectional view illustrating a braking operation (locking operation) executed by an annular brake member of the brake mechanism 50 by way of example.

In FIG. 4, reference numeral 51 designates a linear guide (only a part of which is drawn), on which a fitting portion 62 formed on the support unit 60, and two annular fitting portions 53, 54 of the brake member 52 are fitted. The fitting portion 62 of these components, is adapted to be able to move smoothly on the linear guide 51 by means of an appropriate bearing mechanism, unless locked by the brake mechanism, when a external force of more than a predetermined magnitude is applied. On the other hand, an inner diameter of holes formed in the fitting portions 53, 54 is designed to be slightly larger than an outer diameter of a cylindrical bar making up the linear guide 51, so that the fitting portions 53, 54 can be inclined about a shaft 56 fixed on a stationary portion (such as a housing or a frame) of the brake mechanism 50.

Also, a moment can be applied to a base 55 of the brake member 52 by a drive mechanism (such as an electromagnetic drive mechanism, and an air cylinder, etc.) not shown. Specifically, when a command "apply the brake (lock on)" is issued from the robot control unit to the brake mechanism 50, the clockwise moment in the drawing, for example, is applied to the base 55, so that the fitting portions 53, 54 are tilted clockwise in the drawing and are locked on the linear guide 51, together with the fitting portion 62 held between them.

When a command "release the brake (lock off)" is issued from the robot control unit to the brake mechanism 50, the above-mentioned moment ceases to be applied to the base 55, so that the fitting portions 53, 54 and the fitting portion 62 can move again on the linear guide 51. The second-type grasping claw is also provided with a similar brake mechanism, so that the second-type grasping claw can be locked (its position is held) or unlocked on the linear guide 51 by commands from the robot control unit.

Figure 5:
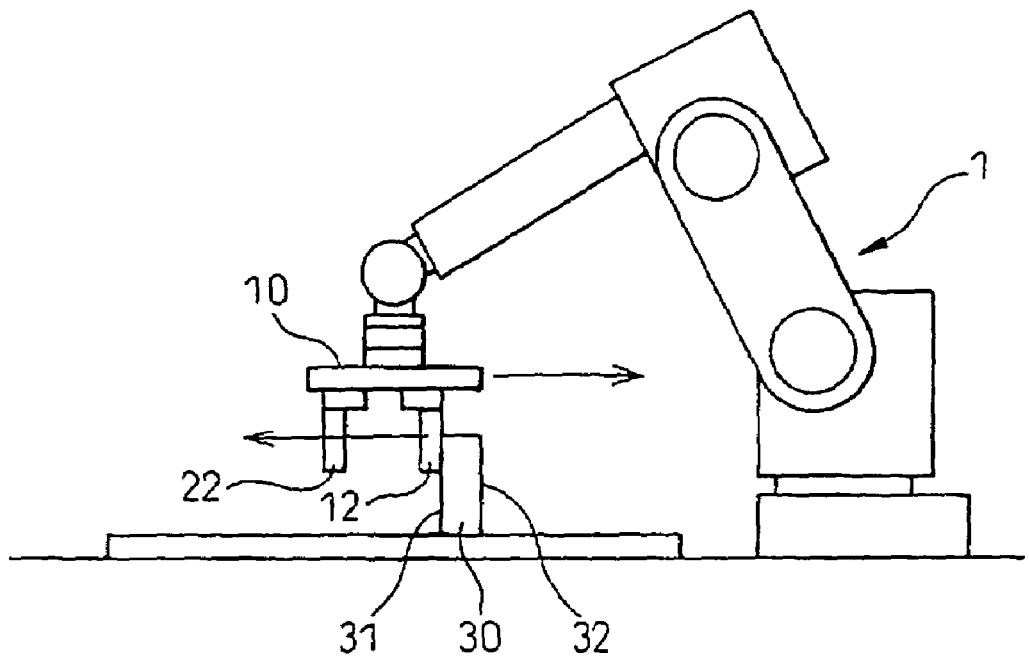
FIG. 5 is a diagram showing the second-type grasping claw (a movable grasping claw having no actuator) moved by a robot operation.

Therefore, in order to change the position of the second-type grasping claw, the locked state of the brake mechanism 50 is canceled, and an external force is then applied, to the second-type grasping claw of which the position is desired to be changed, along a direction in which the particular claw can move. A specific procedure to change the position of the second-type grasping claw will be described with reference to FIG. 5, taking the position adjustment of the grasping claw 12 as an example. FIG. 5 shows a hand viewed from the right side in FIG. 3, in which the hand of the robot 1 is rotated about a wrist axis by 90 degrees from the state shown in FIG. 2.

As shown in FIG. 5, in this embodiment, a stationary stand member 30 is used to change the position of the second-type grasping claws 12, 22. The stationary stand member 30 has contact surfaces 31, 32 with which the second-type grasping claws 12, 22 contact, and is installed at an appropriate position (at a position where the stationary stand member 30 does not interfere with the robot operation) in the operating range of the robot 1. Once the installation position (including the orientation, as described hereinafter) is determined, the robot 1 (robot control unit) is set up for position adjustment of the second-type grasping claw, for example, in the steps described below.

(1) The brake mechanism 50 of the grasping claw 12 and the brake mechanism (not shown) of the grasping claw 22 are released, and the second-type grasping claws 12, 22 are manually moved to respective reference positions (for example, the positions where the grasping claws 12, 22 are farthest from each other).

(2) Each brake mechanism 50 is applied to lock the grasping claws 12, 22.

(3) The robot 1 is manually operated to be fed to bring the grasping claw 12 into contact with the contact surface 31 from left side in the drawing, and the position of the robot 1 at that time is stored For convenience' sake, this position is referred to as a "first contact position".

(4) The robot 1 is manually operated to be fed to bring the grasping claw 12 into contact with the contact surface 32 from right side in the drawing, and the position of the robot 1 at that time is stored. For convenience' sake, this position is referred to as a "second contact position".

(5) The robot 1 is manually operated to be fed to bring the grasping claw 22 into contact with the contact surface 32 from right side in the drawing, and the the position of the robot 1 at that time is stored. For convenience' sake, this position is referred to as a "third contact position".

(6) The robot 1 is manually operated to be fed to bring the grasping claw 22 into contact with the contact surface 31 from left side in the drawing, and the position of the robot 1 at that time is stored. For convenience' sake, this position is referred to as a "fourth contact position".

Once the first to fourth contact positions as described above are stored, the position of the grasping claw 12 or 22 can be changed and set to an arbitrary position within an adjusting range thereof by the programmed operation. For example, when it is desired to move the grasping claw 12 leftward from the position shown in FIG. 5 and lock it, the robot 1 is firstly moved leftward by a small distance from the first contact position. Then, the robot 1 is moved rightward and positioned at the first contact position. The brake mechanism 50 is released, for example, at this position. The robot 1 is moved farther rightward by the desired distance and positioned at that location.

In this way, the grasping claw 12 is brought into contact with the contact surface 31 in the process (or from the beginning in the case that the grasping claw 12 is located at the reference position described above), and is moved leftward by a distance equal to the subsequent moving distance of the robot 1 (equal to the moving distance of the hand base 10). When the movement is complete, the brake mechanism 50 is applied to lock the grasping claw 12. The rightward position change of the grasping claw 12 and the rightward or leftward position change of the grasping claw 22 can be executed, of course, by a similar programmed operation.

It is, of course, apparent from the foregoing description that the position change and locking of the second-type grasping claws 12, 22 are possible by the manual feed of the robot 1 and the manual lock on/off operation of the brake mechanism, instead of by the programmed operation. Also, a location where the second-type grasping claws 12, 22 are to be locked can be appropriately selected so as to grasp the target workpiece stably and securely.

The movement of the first-type and second-type grasping claws relative to the hand base 10 has been described above with reference to a case in which the grasping claws 11, 12 and 22 are mounted on the hand mechanism. However, as described above, at least a part of the first-type and second-type grasping claws can be changed using the retaining mechanism. In this embodiment, all of the grasping claws 11, 12, 22, 14 to 16 (see FIG. 2) prepared for the robot system can be changed, using an retaining mechanism attached on each holding portion and a pull bolt mating therewith. The retaining mechanisms of the grasping claws are similar to each other and cooperate with the pull bolt. Therefore, the retaining mechanism of the grasping claw 12 will be described as an example of the retaining mechanisms of the grasping claws, with reference to FIG. 6. Further, with additional reference to FIGS. 7 and 8, the detail of the retaining mechanism and the application of the retaining mechanism to (or dual use of the retaining mechanism as) the workpiece holding means will be described.

Figure 6:
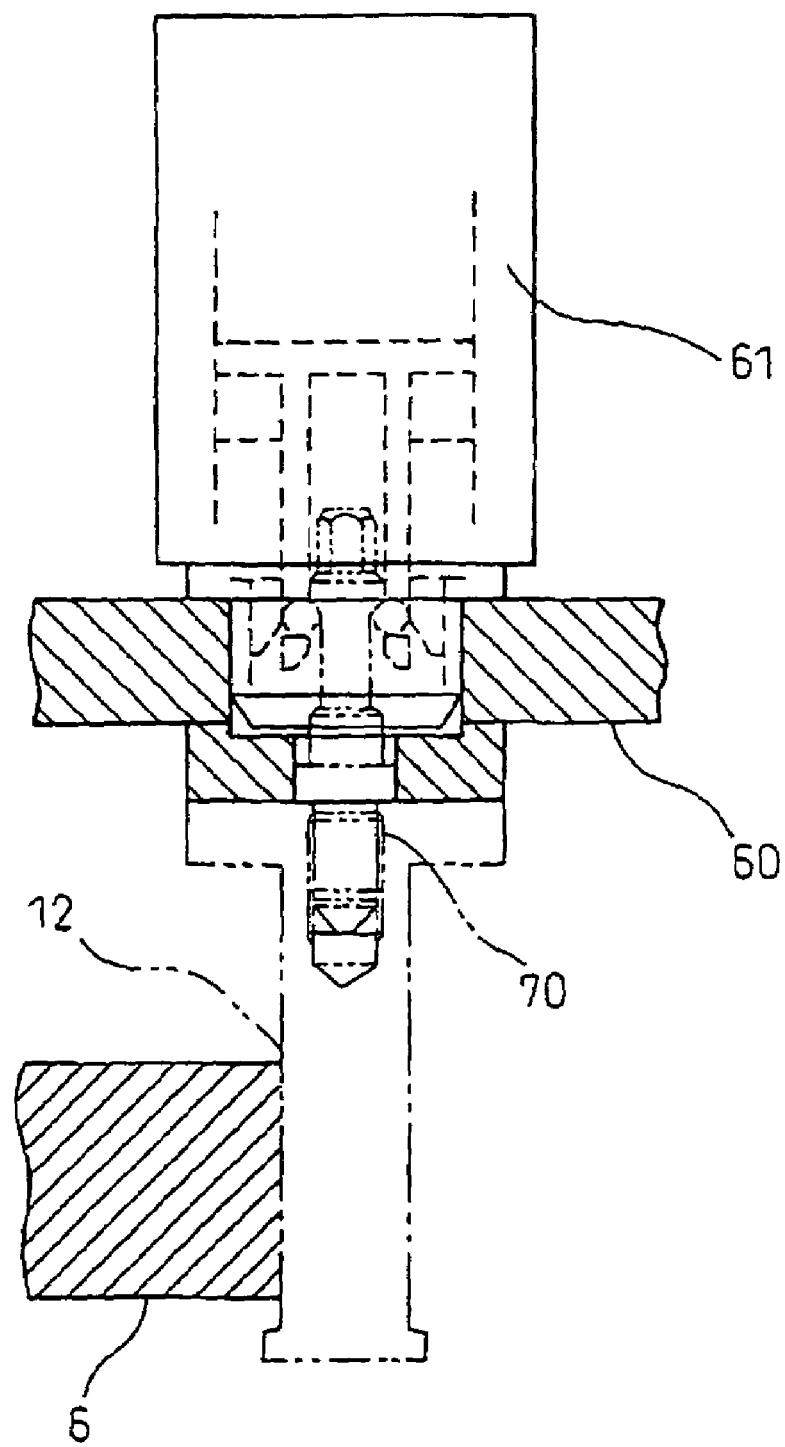
FIG. 6 is a sectional view illustrating a procedure for mounting and dismounting the grasping claw according to the embodiment of the present invention.

FIG. 6 is a sectional view illustrating a procedure for mounting and dismounting the grasping claw 12. As shown in FIG. 6, a pull bolt 70 is fixed on the grasping claw 12. For this purpose, a front portion (a portion on the side fixed to the grasping claw) of the pull bolt 70, for example, is threaded, and a threaded hole adapted to engage with the thread of the pull bolt 70 is formed at a predetermined location of the grasping claw 12. Thus, the pull bolt 70 is screwed into the threaded hole, thereby being fixedly attached to the grasping claw 12.

The support unit 60 for the grasping claw 12 has an opening for receiving the pull bolt 70, and the retaining mechanism 61 is provided in the depth of the opening. This retaining mechanism 61 is adapted to automatically engage with the rear portion of the pull bolt 70 (a portion far from the side fixed to of the grasping claw) by pushing the pull bolt 70 into it. This retaining mechanism can hold such an engaged (locked) state by a hold command from the robot control unit and release it by a release command.

Figure 7:
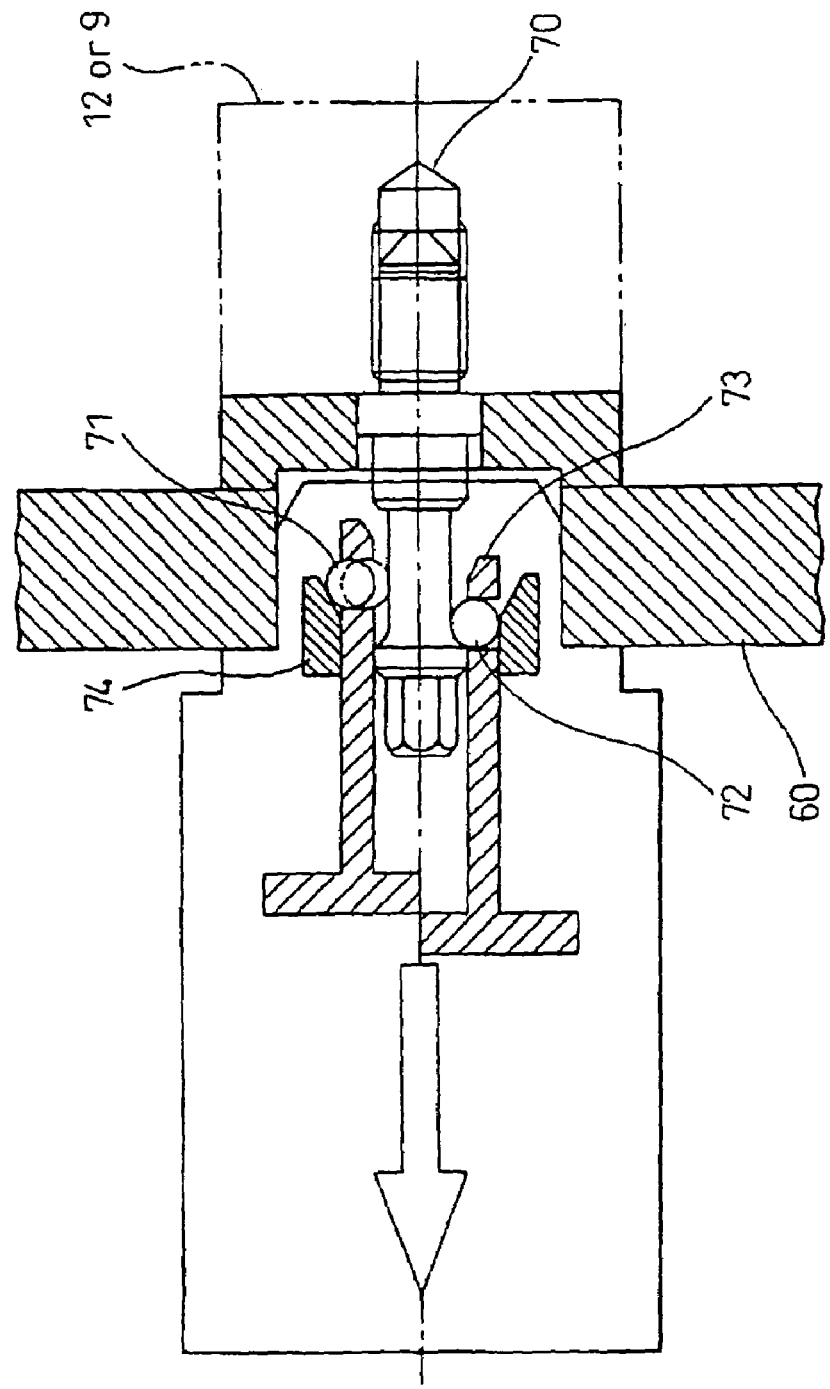
FIG. 7 is a sectional view illustrating a retaining mechanism employed in the embodiment of the present invention.

FIG. 7 is a sectional view showing a configuration of the retaining mechanism. The retaining mechanism can selectively hold or release the pull bolt 70 by switching a plurality of (two in the shown case) round elements 71, 72 between a non-loose state and a loose state. In FIG. 7, reference numeral 73 designates a round element control member, and numeral 74 designates a ring-shaped tapered sleeve. The round element control member 73 is a substantially cylindrical member adapted to receive the rear portion (engaging portion) of the pull bolt 70, and is formed near the forward end (right end in the drawing) thereof with a hole for accommodating the round elements 71, 72 and cooperating with the taper sleeve 74 to restrict the motion of the round element units 71, 72 in accordance with a spatial relationship between the taper sleeve 74 and the hole.

This hole is a through hole extending in a radial direction of the cylinder, and an interior and an outlet thereof near to the taper sleeve 74 are designed to be slightly larger than the diameter of the round elements 71, 72, while an outlet far from the taper sleeve 74 (nearer to the center axis of the cylinder) is designed to be slightly smaller than the diameter of the round elements 71, 72. The taper sleeve 74, like the support unit 60, is fixed on the hand base (not shown in FIG. 7), so that it is not influenced by the motion of the round element control member 73 and remains stationary.

For convenience of explanation, in FIG. 7, both of the "held state" (lower side in FIG. 7) and the "released state" (upper side in FIG. 7) of the round element control member 73 are shown at the same time. However, the round element control member 73 is actually in only one of these states or in an intermediate state between them. As shown in FIG. 6, in order to mount the grasping claw having the pull bolt 70 attached thereto on the support unit 60, the round element control member 73 is set in the released state, and the rear portion of the pull bolt 70 is pushed into the opening of the support unit 60. Then, a hold command is sent from the robot control unit to an air cylinder mechanism. As the air cylinder mechanism generates a pulling force leftward in FIG. 7 and applies it to the round element control member 73, the round element control member 73 is urged leftward, thereby to restrict the motion of the round elements 71, 72 and press the round elements 71, 72 against the taper sleeve 74.

This moves the round elements 71, 72 inward (toward the pull bolt 70), so that parts of the round elements 71, 72 project more inward (toward the center axis of the cylinder) than the inner surface of the round element control member 73. As a result, an attempt to pull off the pull bolt 70 would fail, because the shoulder formed at the end of the pull bolt 70 come into contact with the round elements 71, 72 as shown in FIG. 7. In this way, the grasping claw having the pull bolt 70 attached thereto is completely mounted on the support unit 60. In order to dismount the grasping claw having the pull bolt 70 attached thereto, a release command is sent from the robot control unit to the air cylinder mechanism to release the pulling force leftward in FIG. 7, and the pull bolt 70 is pulled off the support unit 60 rightward. By pulling the pull bolt 70 rightward, the round elements 71, 72 are moved outward (away from the pull bolt 70), so that it does not project inward (toward the center axis of the cylinder). As a result, the pull-off operation of the pull bolt 70 is not hampered and the grasping claw can be dismounted from the support unit 60 together with the pull bolt 70.

Figure 8:
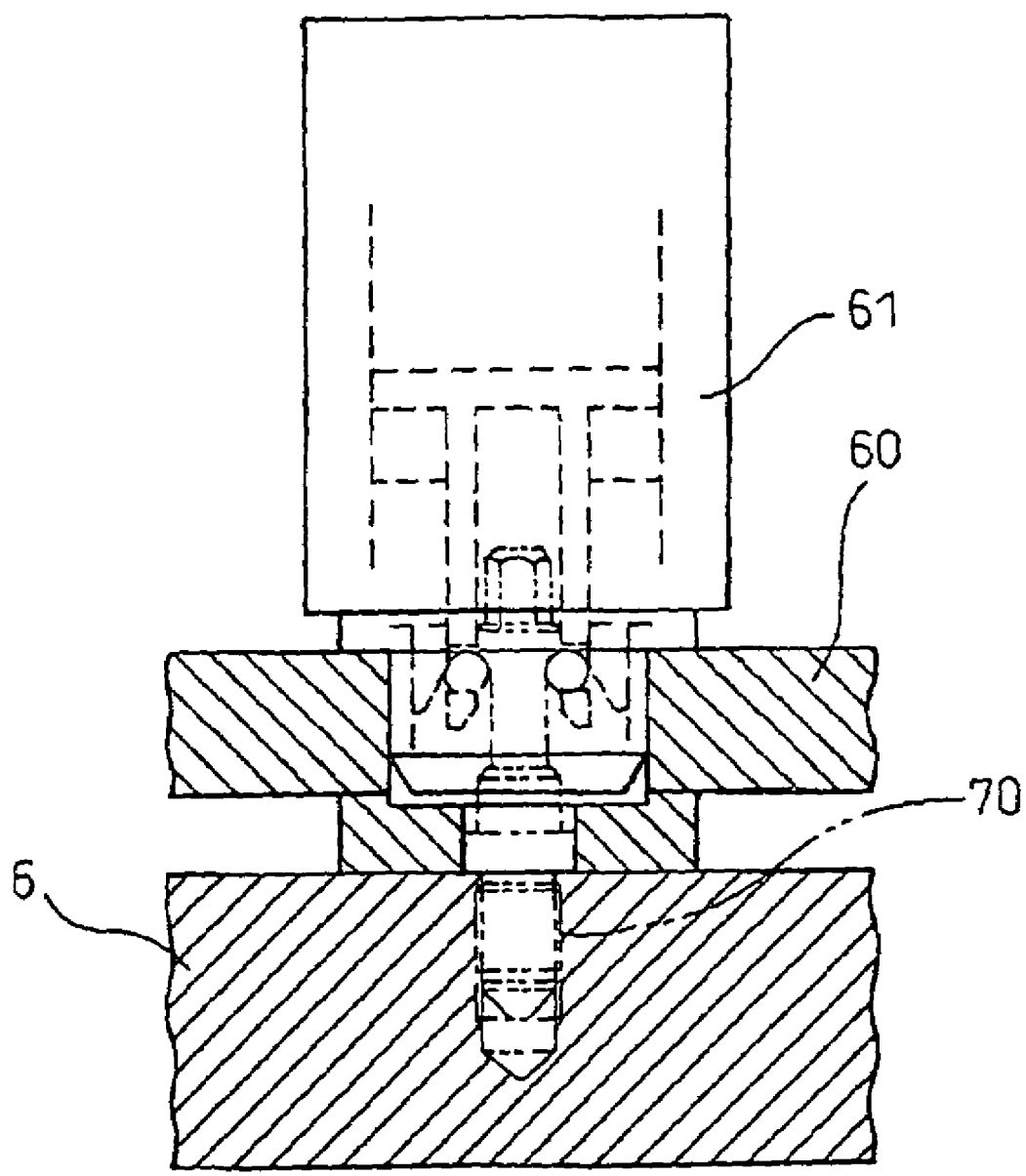
FIG. 8 is a diagram illustrating a case in which the retaining mechanism shown in FIG. 7 is used as a means for retaining the replaceable grasping claw and/or a means for holding a workpiece having a pull bolt attached thereto.

As can be easily understood from the foregoing description, even if the pull bolt 70 is attached to an object other than the grasping claw, the object can be mounted or dismounted on or from the support unit 60 in exactly the same way. Therefore, the combination of the retaining mechanism and the pull bolt also can be used for holding the workpiece. FIG. 8 shows an example. As shown in FIG. 8, the pull bolt 70 is attached to the workpiece 6 to be held, in the same manner (screwing) as it is attached to the grasping claw. The resulting assembly is mounted on the support unit 60 using the retaining mechanism 61 described above. As a result, the workpiece 6 is held by the support unit 60. In order to release the workpiece 6, the "release command" described above is sent from the robot control unit to the cylinder mechanism, for example, when the robot is in a position where the workpiece 6 is positioned just under the hand mechanism (the pull bolt 70 can be pulled off by the weight of the workpiece 6 and the pull bolt 70).

This mounting/dismounting operation using the pull bolt and the retaining mechanism can be automatically performed by a program stored in the robot control unit. Specifically, the workpiece or the grasping claw having the pull bolt attached thereto is positioned in the operating range of the robot, and the robot control unit is taught a procedure for mounting or dismounting it in advance. The procedure (programmed operation) for this purpose is very simple as described below.

(1) The robot is positioned at an approach point in the neighborhood of the workpiece or the grasping claw having the pull bolt 70 attached thereto. The approach point is defined, for example, as a position where the opening of the support unit 60 is axially aligned just above the pull bolt 70.

(2) It is checked that the air cylinder mechanism is in a release mode.

(3) The robot is moved straight down by a predetermined distance.

(4) The air cylinder is set in a hold mode.

On the other hand, the procedure for dismounting the grasping claw or the workpiece from the support unit 60 is as follows.

(5) The robot is moved to a place where the grasping claw or the workpiece to be dismounted is accommodated. The robot is rendered to be in a position where the grasping claw or the workpiece is positioned just under the hand mechanism.

(6) The air cylinder mechanism is set in a release mode. As a result, the grasping claw or the workpiece, as the case may be, can be dismounted from the support unit 60 by its own weight. In place of the weight, a mechanism for automatically engaging with a grasping claw or a workpiece may be prepared at the place for accommodating the grasping claw or the workpiece. In this case, after the grasping claw or the workpiece is engaged with the engaging mechanism, the robot is moved up to pull the grasping claw or the workpiece having the pull bolt attached thereto from the support unit 60.

According to the present invention, the provision of the movable grasping claw having no actuator can reduce the size of the hand, while at the same time reducing the area where the hand and the surrounding devices interfere with each other. Also, the design to enable the grasping claw only to be changed makes it possible to construct an inexpensive robot system and to realize a stable handling operation. Further, only one set of hands can handle various types of workpieces by arranging the grasping claws at positions suitable for each workpiece. Furthermore, using the retaining mechanism of the grasping claw of the hand also for holding or releasing the workpiece allows the workpiece to be handled in a greater variety of ways. As a result, for example, in the case that even a workpiece not suitably held by the grasping claw is desired to be handled, it can be properly handled without adding a special mechanism.

Although the present invention has been described with reference to the embodiments shown in the accompanying drawings, these embodiments are only illustrative but not limitative. Accordingly, the scope of the present invention is only limited by the appended claims, and the preferred embodiments of the present invention may be modified or changed without departing from the scope of the claims.

What is claimed is:

1. A robot hand mounted on a robot for handling a workpiece, said robot comprising:
   a base member;
   a first claw mechanism; and
   a second claw mechanism, said first claw mechanism comprising:
   at least one first grasping claw;
   a first support means for movably supporting said first grasping claw; and
   an actuator for moving said first grasping claw relative to said base member, said second claw mechanism comprising:
   at least one second grasping claw;
   a braking means adapted to be in a release state or an operating state; and
   a second support means for allowing an external force applied to said second grasping claw to move said second grasping claw with respect to said base member and change a relative position thereof relative to said base member when said braking means is in the release state, while supporting said second grasping claw to hold the relative position when the braking means is in the operating state, said external force being applied to said second grasping claw by operating said robot to move said base member with said second grasping claw in contact with a contact member which is arranged at a predetermined position in an operational range of said robot having said hand mounted thereon;

wherein at least one of said first grasping claw and said second grasping claw is configured to be replaceably mounted on one of said first support means and said second support means; and wherein an engaging portion is formed in a rear portion of said replaceable grasping claw, and wherein a retaining mechanism capable of engaging and disengaging said engaging portion with or from said support means of each grasping claw is disposed on said support means of each grasping claw.

2. The robot hand according to claim 1, wherein said replaceable grasping claw comprises a claw body and a pull bolt mounted in a threaded hole formed in a rear portion of said claw body, and said engaging portion is disposed in a rear portion of said pull bolt.

3. A handling robot system including a robot having mounted thereon a robot hand, comprising:

a base member;

a first claw mechanism; and a second claw mechanism, said first claw mechanism comprising:

at least one first grasping claw;

a first support means for movably supporting said first grasping claw; and an actuator for moving said first grasping claw relative to said base member, said second claw mechanism comprising:

at least one second grasping claw;

a braking means adapted to be in a release state or an operating state; and a second support means for allowing an external force applied to said second grasping claw to move said second grasping claw with respect to said base member and change a relative position thereof relative to said base member when said braking means is in the release state, while supporting said second grasping claw to hold the relative position when the braking means is in the operating state, said external force being applied to said second grasping claw by operating said robot to move said base member with said second grasping claw in contact with a contact member which is arranged at a predetermined position in an operational range of said robot having said hand mounted thereon;

wherein at least one of said first grasping claw and said second grasping claw is configured to be replaceably mounted on one of said first support means and said second support means; and wherein said replaceable grasping claw is automatically replaced by a robot operation.

* * * * *